United States Patent [19]

Smith

[11] 4,391,713

[45] Jul. 5, 1983

[54] REVERSE OSMOSIS UNIT-DEGASIFIER SYSTEM

[75] Inventor: Verity C. Smith, Dedham, Mass.

[73] Assignee: Vaponics Inc., Plymouth, Mass.

[21] Appl. No.: 311,883

[22] Filed: Oct. 15, 1981

Related U.S. Application Data

[63] Continuation of Ser. No. 161,339, Jun. 20, 1980, abandoned.

[51] Int. Cl.³ ...................... B01D 31/00; B01D 13/00
[52] U.S. Cl. ................................. 210/652; 210/188; 210/259; 210/416.1
[58] Field of Search ................... 210/321.1, 433.2, 259, 210/652, 416.1, 188

[56] References Cited

U.S. PATENT DOCUMENTS

| | | | |
|---|---|---|---|
| 2,413,509 | 12/1946 | Lord | 210/51 |
| 2,611,490 | 9/1952 | Robinson | 210/150 |
| 2,849,120 | 8/1958 | McMichael et al. | 210/193 |
| 3,243,046 | 3/1966 | Kakumoto et al. | 210/199 |
| 3,355,019 | 11/1967 | Mitchell | 210/104 |
| 3,568,843 | 3/1971 | Brown | 210/258 X |
| 3,651,617 | 3/1972 | Hodgson | 55/32 |
| 3,917,526 | 11/1975 | Jennings | 210/321.1 X |
| 4,176,057 | 11/1979 | Wheatley et al. | 210/259 X |

Primary Examiner—Frank A. Spear, Jr.
Attorney, Agent, or Firm—Kenway & Jenney

[57] ABSTRACT

The high pressure waste water from a reverse osmosis unit is conveyed to an eductor where it creates a source of low pressure for operating a degasifier that removes carbon dioxide from the water treated by the reverse osmosis unit.

2 Claims, 1 Drawing Figure

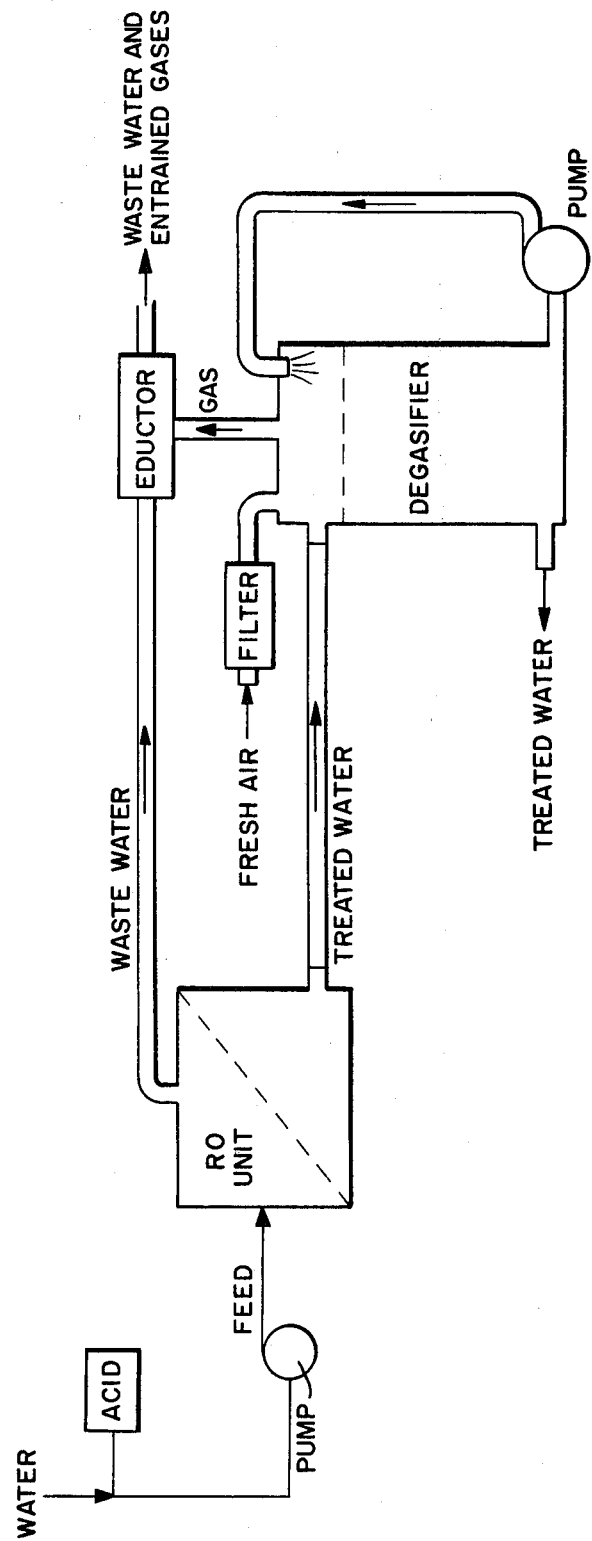

REVERSE OSMOSIS UNIT-DEGASIFIER SYSTEM

This is a continuation of application Ser. No. 161,339, filed June 20, 1980, now abandoned.

BACKGROUND OF THE INVENTION

The invention relates generally to the treatment of water by reverse osmosis units, and particularly to those units that require degasification to remove carbon dioxide.

Reverse osmosis membranes are frequently used to treat water to remove certain impurities. The elements making up a reverse osmosis membrane require that water fed to the membrane have a pH below 8.5, otherwise they rapidly lose their capacity to function. In order to achieve the desired pH, water fed to the membrane is often treated by an acid to lower the pH prior to feeding the water to the unit. The combination of acid and water, however, may lead to the generation of carbon dioxide in the water. Since reverse osmosis membranes are permeable to carbon dioxide, the carbon dioxide will remain in the water passed through the unit.

The carbon dioxide, which is undesirable, may be removed by sending the carbon dioxide-loaded water through a degasifier, but this ordinarily requires the expenditure of energy to operate the degasifier. The degasifier operates by passing the water through a tank where the carbon dioxide in the water rises to the top of the tank where a space is maintained. The carbon dioxide is removed from this space.

In U.S. Pat. No. 3,917,526 (Jennings) the stream from a membrane is used to affect the eduction removal of foam from the to of a flotation stage in a process for removing suspended solids, fats, oily wastes, etc. from a liquid stream. The liquid stream passes through the flotation system before entering the reverse osmosis membrane system in the arrangement shown in that patent.

It is an object of the invention to provide for a reverse osmosis/degasifier in which less energy is required for operation.

SUMMARY OF THE INVENTION

The invention comprises a reverse osmosis unit/-degasifier combination in which the reverse osmosis unit's waste water outlet is connected to an eductor. The eductor produces a low pressure that sweeps a carbon dioxide degasifier to which water treated by the RO unit is conveyed. The water to operate the eductor and the water to be treated by the degasifier operated by the eductor leave the RO unit substantially at the same time so that the power source (RO unit waste water) is available as soon as the water entering the degasifier can use it.

BRIEF DESCRIPTION OF THE DRAWING

Other objects, features and advantages of the invention will be apparent from the following description including the drawing consisting of a single FIGURE showing the system embodying the invention in diagrammatic form.

DESCRIPTION OF THE PREFERRED EMBODIMENT

The drawing shows a portion of a water treatment system including a reverse osmosis unit (RO unit) having a permeable membrane, and a degasifier. Located on the water supply line to the inlet of the RO unit is a tank holding a supply of acid that is connected by a feed to the water supply line. Further along the supply line is a pump for creating the high pressure needed to operate the RO unit. The RO unit has two outlets, a waste water outlet for removing from the unit untreated water (still at high pressure), and a treated water outlet, for removing water treated by the RO unit.

The degasifier includes a tank that ordinarily, during the process, has a lower portion filled with water and an upper portion free of water. A degasifier inlet is connected by a conduit to the RO unit treated water outlet for conveying that water to the degasifier. An air supply duct leads to the upper portion of the degasifier tank, a filter being located in the duct between the air intake and the tank. An eductor has a low pressure chamber that is connected to the upper tank portion by an air conduit, opposite the air supply connection to the chamber, so that air entering the chamber from the air supply can be swept across the top of water in the tank before being discharged via the eductor. The degasifier includes a recirculating pump connected to an outlet at the bottom of the tank for recirculating water in the tank to the top of the tank where it can be sprayed through a nozzle into the tank's upper chamber. Said pump might also serve as the distribution pump for the processed water. An outlet for withdrawing degasified water is located at the bottom of the tank. Another configuration omits the air inlet and allows the eductor to draw a slight vacuum which reduces the dissolved gases from the purified water in the tank.

A principal aspect of the invention is the connection of the eductor to the waste water outlet of the RO unit. This waste water is ejected from the RO unit at a very high pressure. Rather than discarding this energy, the waste water outlet is connected by a conduit to the eductor and the water pressure is used to operate it.

In the operation of the system, raw water is fed to the RO unit for treatment. If the pH value of the water is too high for non-destructive use of the RO unit membrane (e.g. a pH value exceeding 8.5) or the salts in the water leave scale deposits, acid is fed to the raw water to lower its pH value. For example, raw water having a pH of 8.0 might be fed into the system at a rate of 10 gallons per hour. An acid such as $H_2SO_4$ would be added to the water from the acid holding tank, reducing the pH to a value of approximately 6.0. The pump feeds this water, treated with acid, to the inlet of the RO unit. Since the RO unit needs high pressure water input for operation, the pump increases the water pressure to about 200 psi.

As a result, with water entering the RO unit at 10 gph and a pressure of 200 psi, eventually there is a discharge outlet at a rate of 5 gph, and a discharge of waste water at the other discharge outlet at a rate of about 5 gph, and at a pressure of 40 psi.

The water treated by the RO unit passes through the conduit to the intake of the degasifier tank. The acid, $H_2SO_4$, added to the water to lower its pH, has resulted in the generation of carbon dioxide. The presence of $CO_2$ in the water is, naturally, undesirable. The degasifier represents a common technique for removing the $CO_2$. The $CO_2$ in the water brought into the degasifier tank rises to the surface and occupies the upper portion of the tank that is free of water. The effect is enhanced by recirculation of water in the tank by the recirculating pump. Water is brought up to the top of the top tank and is sprayed through the nozzle in the top of the tank, where the water gives up its $CO_2$ content.

The low pressure air chamber is connected to the upper portion of the tank. It sucks the carbon dioxide that has settled there out of the tank. The air inlet gives a source of air to the upper chamber so that this sweep of the upper chamber is possible. Water free of $CO_2$ is conveyed out of the tank outlet.

As explained above, the high pressure RO unit waste water discharge creates in the eductor low pressure air chamber a pressure of about $-10$ psi. This water pressure is available to operate the eductor as soon as the RO unit itself begins to operate. Therefore there is no delay in starting up the system. Treated water for the degasifier leaves the RO unit at the same time that waste water to operate the eductor leaves the RO unit.

The advantage of the described embodiment is that it conserves energy that would otherwise be discarded. It encourages the use of acid treatment of raw water, to preserve the RO unit membrane, because it makes the use of a degasifier more feasible. It provides an integrated system that requires no start-up auxiliary steps or temporary inoperability of parts of the system: as soon as water is being brought to the tank for degasification, water (from another source) is being brought to the eductor to operate the degasifier.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A reverse osmosis membrane unit and degasifier system comprising:
    a reverse osmosis unit having an inlet for receiving water under high pressure, an outlet for water passed through the reverse osmosis membrane, and an outlet for waste water, said outlet discharging said waste water at high pressure;
    a carbon dioxide degasifier having an inlet connected to said outlet for water passed through the reverse osmosis membrane, and means for degasifying said water, said degasifying means responsive to a source of low pressure;
    a educator means for producing low pressure in response to a flow of liquid under high pressure;
    means for conveying said waste water under high pressure from said RO unit to said educator means for producing low pressure, as said carbon dioxide degasifier is receiving said water passed through the reverse osmosis membrane; and means for connecting said low pressure to degasifier.

2. A method of degasifying water passed through the reverse osmosis membrane of an RO unit, comprising the steps of:
    providing a degasifier having an inlet for receiving water to be degasified and a low pressure chamber for removing gas from said degasifier;
    conveying the output of said RO unit to said degasifier;
    providing an educator for producing low pressure in response to a flow of liquid under high pressure;
    conveying the waste water under high pressure from said RO unit to said educator to produce low pressure in said educator in response to the flow of waste water as said degasifier is receiving said water passed through the RO unit; and
    connecting said educator to said degasifier low pressure chamber.

* * * * *